United States Patent
Brattberg et al.

(10) Patent No.: US 8,290,672 B2
(45) Date of Patent: Oct. 16, 2012

(54) METHOD AND A SYSTEM FOR CONTROLLING A VEHICLE

(75) Inventors: Björn Brattberg, Torshälla (SE); Daniel Jansson, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 501 days.

(21) Appl. No.: 12/516,389

(22) PCT Filed: Dec. 6, 2006

(86) PCT No.: PCT/SE2006/001390
§ 371 (c)(1),
(2), (4) Date: May 27, 2009

(87) PCT Pub. No.: WO2008/069706
PCT Pub. Date: Jun. 12, 2008

(65) Prior Publication Data
US 2010/0030438 A1 Feb. 4, 2010

(51) Int. Cl.
*B60K 17/00* (2006.01)
(52) U.S. Cl. .............................. 701/67; 701/68; 180/306
(58) Field of Classification Search .............. 701/50, 701/67, 68; 477/176; 180/306
See application file for complete search history.

(56) References Cited

U.S. PATENT DOCUMENTS

| | | | |
|---|---|---|---|
| 7,066,863 B2 * | 6/2006 | Aumann | 477/169 |
| 7,373,235 B2 * | 5/2008 | Werner et al. | 701/67 |
| 7,739,020 B2 * | 6/2010 | Legner | 701/67 |
| 2001/0049576 A1 * | 12/2001 | Wheeler et al. | 701/67 |
| 2004/0210374 A1 | 10/2004 | Werner et al. | |
| 2005/0241873 A1 * | 11/2005 | Hofler | 180/306 |

FOREIGN PATENT DOCUMENTS

| | | |
|---|---|---|
| DE | 19733465 A1 | 2/1998 |
| WO | 0117815 A1 | 3/2001 |
| WO | 2004005774 A1 | 1/2004 |

OTHER PUBLICATIONS

International Search Report for corresponding International Applciation PCT/SE2006/001390.
International Preliminary Report on Patentability for corresponding International Application PCT/SE2006/001390.

* cited by examiner

*Primary Examiner* — Jeremy R Severson
(74) *Attorney, Agent, or Firm* — WRB-IP LLP

(57) ABSTRACT

A method is provided for controlling a vehicle, including receiving an operator input indicative of a desired power for at least one predetermined function, and variably controlling at least one pressure-actuated friction slip clutch in a vehicle powertrain in response to the received operator input in order to control a torque transmitted via the friction slip clutch.

31 Claims, 4 Drawing Sheets

METHOD AND A SYSTEM FOR CONTROLLING A VEHICLE

BACKGROUND AND SUMMARY

The present invention relates to a method and a system for controlling a vehicle. The invention is further directed to a heavy vehicle and especially to a work vehicle comprising such a control system.

The term heavy vehicle comprises different types of commercial transportation vehicles, such as trucks, buses and work vehicles. The term work vehicle comprises different types of material handling vehicles like construction machines, such as a wheel loader, an articulated hauler, a backhoe loader and a motor grader. A work vehicle is for example utilized for construction and excavation work, in mines etc. Work vehicles are also referred to as work machines. Further terms frequently used for work vehicles are "earth-moving machinery" and "off-road work machines". The invention will be described below in a case in which it is applied in a wheel loader. This is to be regarded only as an example of a preferred application.

A powertrain is arranged for supplying torque to the wheels of the wheel loader. A previously known powertrain comprises an internal combustion engine (normally a diesel engine), a gearbox and a hydrodynamic torque converter arranged between the engine and the gearbox. The gearbox provides different gear ratios for varying the speed of the vehicle, and for changing between forward and backward driving direction. The gearbox may be an electrically-controlled automatic gearbox of the "power-shift" type.

In addition to supply torque to the wheels, the engine has to supply energy to a hydraulic pump of a hydraulic system of the wheel loader. Such a hydraulic system is used for lifting operations and/or steering the wheel loader. Hydraulic working cylinders are arranged for lifting and lowering a lifting arm unit, on which a work implement in the form of a bucket or other type of attachment or working tool is mounted. By use of another hydraulic working cylinder, the bucket can also be tilted or pivoted. The wheel loader is articulated and further hydraulic cylinders known as steering cylinders are arranged to turn the wheel loader by means of relative movement of a front and rear body part of the wheel loader.

The torque converter is used to increase the torque during particularly heavy working operations, such as filling, the bucket or acceleration of the wheel loader. The torque converter can very quickly adapt the output torque to the current working conditions. However, the torque converter has often a very low efficiency which is also dependent on the current driving conditions. The efficiency can be increased if the torque converter is provided with a lock-up function which can be used for direct operation. However, the gear ratio is fixed (1:1) in the lock-up state, and the problem of low efficiency remains during working operations where such a lock-up function cannot be used.

Further, the torque converter is adapted to protect the engine from sudden rapid changes in the working conditions of the gearbox and the wheels. More specifically, the torque converter provides an elasticity that enables a very quick adaptation of the output torque to the changes in the working conditions of the gearbox and the wheels.

For example, if a wheel loader without the elasticity of a torque converter or similar is driven into an obstacle so that the vehicle stops this will also stop the combustion engine, since the engine in such designs is rigidly and unyieldingly connected to the rotation of the wheels. However, this will not happen if a torque converter or similar is arranged between the engine and the wheels or more preferably between the engine and the gear box. On the contrary, if the wheels of the wheel loader stops this causes the output side (the turbine side) of the torque converter to stop whereas the input side (the pump side) continues to rotate together with the engine. The engine will experience a larger internal resistance from the torque converter but it will not come to a standstill.

Further, the powertrain is individually designed for a specific vehicle type and weight etc. More specifically, the torque converter is individually designed for co-operation with a specific engine and transmission.

In wheel loader operation, the operator controls the engine speed by depressing the gas pedal in order to supply torque for propelling the vehicle and lifting the work implement. The functions propelling the vehicle and lifting the work implement are mutually dependent and the torque converter is correspondingly matched with regard to the design of the powertrain and the hydraulic system. However, due to this design, the vehicle computer cannot know whether the intention of the operator is to lift a load fast or demand a high propelling speed upon depression of the gas pedal.

It is desirable to achieve a method for controlling a vehicle, which creates conditions for a more efficient operation with regard to energy consumption. An aspect of the invention is particularly directed at a method that creates conditions for eliminating a torque converter in the powertrain.

A method according to an aspect of the present invention comprises the steps of receiving an operator input indicative of a desired power for at least one predetermined function, and variably controlling actuation of at least one friction slip clutch in a vehicle powertrain in response to the received operator input in order to control a torque transmitted via the friction slip clutch.

Thus, the friction slip clutch is adapted for torque transmission in a plurality of different actuation states, i.e slip states, and replaces the conventional torque converter in the powertrain. In other words, the friction slip clutch is adapted to maintain a differential speed, i.e a certain slip, during operation of the vehicle, i.e during power transmission.

By means of replacing the conventional torque converter with the friction slip clutch, the low efficiency operation of the torque converter can be eliminated, at least in some operational states.

The friction slip clutch has different inherent characteristics than the torque converter and is preferably controlled, at least in a certain operation state, in such a manner that the characteristics of the conventional torque converter are simulated. The characteristics of the conventional torque converter are for example simulated during load disturbances etc on the powertrain during operation. More specifically, the friction slip clutch is controlled to slip to a certain extent during such disturbances.

Actuation of the friction slip clutch is performed by applying a force on a clutch disc pack, wherein a motive power for propelling the vehicle is effected.

By replacing the torque converter with the friction slip clutch, conditions are created for using one specific friction slip clutch type for a plurality of vehicle types, wherein the friction slip clutch is controlled differently in each individual powertrain type. Thus, conditions are created for an improved standardization. Further, an aspect of the present invention creates conditions for more freedom in powertrain control since the torque transmission via the friction slip clutch is controlled electronically.

Further, an aspect of the invention creates conditions for separating the control of the functions propelling the vehicle and controlling the work hydraulics for lifting etc. This may be achieved in that the propelling speed may be controlled by depression of a gas pedal and that both the speed of movement and the power of the work implement are controlled in response to a position of a manually operated lever. The control unit may be adapted to balance/prioritize the amount of power distributed for propelling the vehicle and the amount of power distributed for controlling the work implement.

According to one embodiment, the method comprises the steps of detecting a vehicle operational parameter, and controlling actuation of the friction slip clutch also in response to the detected vehicle operational parameter. Thus, a torque is determined as a function of the desired power and the vehicle operational parameter. Thereafter, actuation of the friction slip clutch is controlled so that the determined torque is transmitted by the friction slip clutch. Preferably, the method comprises the steps of detecting a vehicle speed and controlling actuation of the friction slip clutch also in response to the detected vehicle speed.

According to a further embodiment, a first operator input is indicative of a desired motive power for propelling the vehicle. The first operator input is received from depression of an accelerator pedal/element. Thus, the torque transmitted via the friction slip clutch is determined on the basis of an input with regard to motive power, and preferably on the basis of depression of the accelerator pedal/element.

According to a further embodiment, the method comprises the step of maintaining a speed of the power source at a substantially constant value at least for one vehicle state. The vehicle state is preferably selected for low gears. Preferably, the engine speed is selected so that the engine supplies a sufficient torque and a turbocharger has a sufficient pressure. Thus, the operator does not influence the engine speed by depressing the gas pedal. Instead, the friction slip clutch is automatically controlled upon depression of the gas pedal. Further, upon a certain depression of the gas pedal, gears are automatically shifted in the gear box.

It is also desirable to achieve a system for controlling a vehicle, which creates conditions for a more efficient operation with regard to energy consumption.

According to an aspect of the present invention, a system is provided comprising an operator controlled element adapted to establish a signal indicative of a desired power for at least one predetermined function, a control unit adapted to receive said signal indicative of the desired power, and in response to said signal establish a signal indicative of a degree of actuation of a friction slip clutch in a powertrain and actuation means for actuating the friction slip clutch in response to the signal from the control unit in order to variably control a torque transmitted via the friction slip clutch.

Further preferred embodiments and advantages will be apparent from the following description and drawings.

BRIEF DESCRIPTION OF THE DRAWINGS

The invention will be explained below, with reference to the embodiments shown on the appended drawings, wherein FIG. 1 schematically shows a wheel loader in a side view, FIG. 2 schematically shows a powertrain of the wheel loader according to the invention, FIG. 3-6 schematically shows different embodiments of a control method, and FIG. 7 discloses an example of a graph for determining friction slip clutch torque.

DETAILED DESCRIPTION

Figure 1:
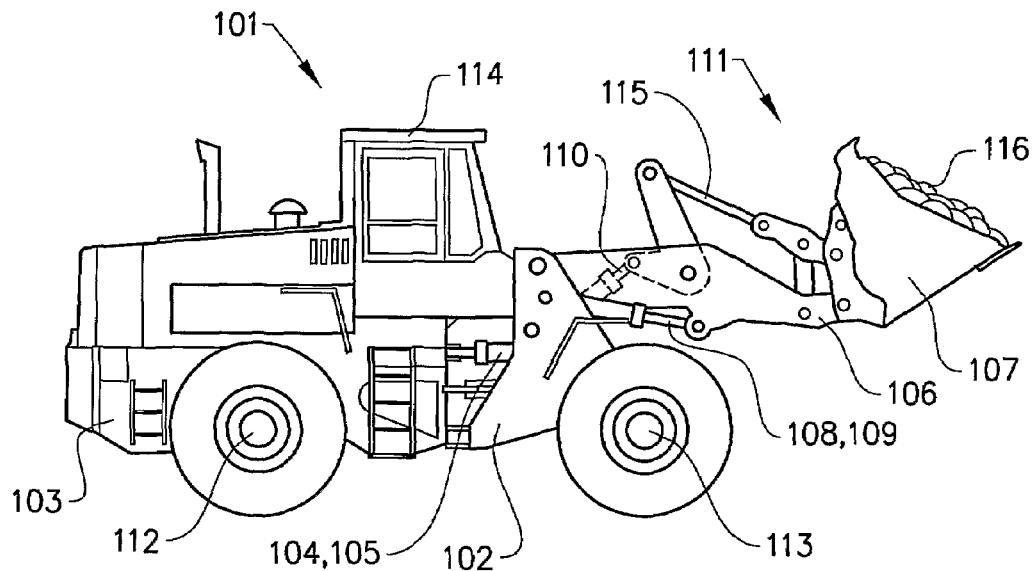

FIG. 1 shows a wheel loader 101. The body of the wheel loader 101 comprises a front body section 102 with a front frame, and a rear body section 103 with a rear frame, which sections each has a pair of half shafts 112,113. The rear body section 103 comprises a cab 114. The body sections 102, 103 are connected to each other via an articulation joint in such a way that they can pivot in relation to each other around a vertical axis. The pivoting motion is achieved by means of two first actuators in the form of hydraulic cylinders 104,105 arranged between the two sections. Thus, the wheel loader is an articulated work vehicle. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106 and an implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

Figure 2:
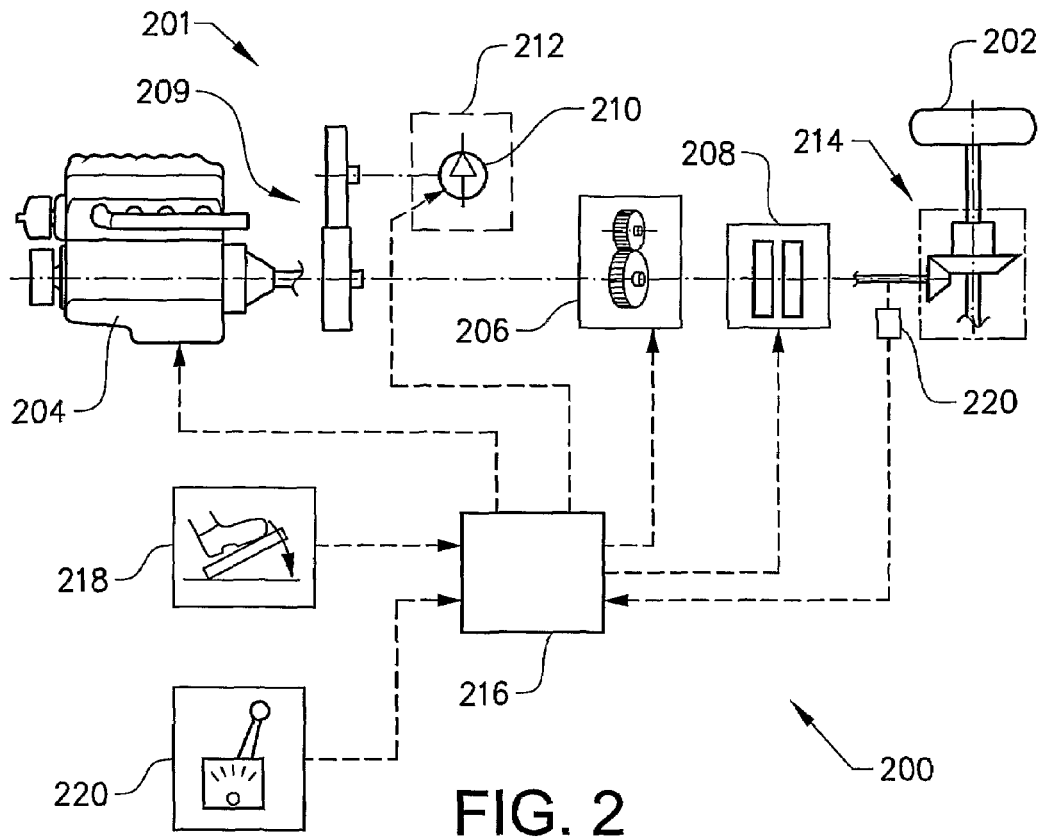

FIG. 2 shows a system 200 for controlling the wheel loader. The system comprises a powertrain 201 for supplying torque to the wheels 202 of the wheel loader. The powertrain 201 comprises a power source 204 in the form of an internal combustion engine (a diesel engine), a gearbox 206 and a friction slip clutch 208 arranged after the gearbox 206. Thus, the friction slip clutch 208 is arranged separate from a gear shifting apparatus in the gearbox 206. The gearbox 206 provides different gear ratios for varying the speed of the vehicle, and for changing between forward and backward driving direction.

The friction slip clutch is adapted to transmit torque to the wheels 202 via a central gear mechanism 214 in a drive axle. The friction slip clutch is adapted for a continuous slip within its operating range. Thus, the friction slip clutch transmits a specific torque when a certain pressure is applied to it. Thus, the friction slip clutch 208 is adapted for engaging a rotation member (shaft) in the powertrain in order to transmit power to different extents. Preferably, the friction slip clutch 208 comprises a first and second set of discs, which are arranged in an alternating manner. Further, actuation of the clutch 208 is performed by controlling an application force of a piston adapted to compress the disc pack.

In addition to supply torque to the wheels 202, the engine 204 has to supply energy to a hydraulic pump 210 in a hydraulic system 212 of the wheel loader. The hydraulic pump 210 is adapted to supply driving pressure to the hydraulic cylinders 104,105,108, 109,110. The hydraulic system may be of a conventional type and is not further described here.

The control system 200 further comprises a control unit 216 which is adapted to receive an operator input indicative of a desired power for at least one predetermined function. A first operator input is received from depression of an accelerator pedal/element 218 and indicative of a desired motive power for propelling the vehicle. A second operator input is received from a position of a control element 220, such as an operating lever or joystick, and indicative of a desired power for controlling a work function, such as the lift and/or tilt cylinders 108,109,110. Thus, means is provided for producing an operator input signal, or in other words, an operator command signal.

The control unit 216 is further adapted to control actuation of the friction slip clutch 208 in response to the received operator input in order to control a torque transmitted via the friction slip clutch. Thus, the control unit 216 is adapted to gradually actuate the friction slip clutch in response to the received operator input.

The control unit 216 is further connected to a vehicle speed detection means 220 in the powertrain 201 for receiving a signal indicative of vehicle speed. The control unit 216 is further adapted to control actuation of the friction slip clutch 208 also in response to the detected vehicle speed in order to control the torque transmitted via the friction slip clutch. According to an alternative, vehicle acceleration is determined and the friction slip clutch 208 is controlled also in response to the detected vehicle acceleration.

Since the friction slip clutch is arranged downstream of a branching off point 209 for the pump 210 in the powertrain, when the control unit 216 receives a signal from the work hydraulics operating lever 220, it can reduce the pressure in the friction slip clutch, wherein more power is available for the hydraulic system. The control unit 216 is further adapted to control the engine 204. The control unit 216 is adapted to make adjustments to the electronic fuel injection of the engine. In other words, the control unit 216 is adapted to manage the power distribution and allocate engine power to the power consumers.

The pump 210 may be a variable volume piston pump that can operate at a constant speed and vary its volumetric output by changing the piston stroke. The variable volume piston pump is capable of varying the displacement of the pump per revolution from zero to maximum through built-in mechanical means.

The control unit 216 is commonly known as a central processing unit (CPU) or an electronic control module (ECM) for an electronic control of the vehicle operation. In a preferred embodiment, the control unit is a microprocessor. The control unit 216 comprises a memory, which in turn comprises a computer program with computer program segments, or a program code, for implementing the control method when the program is run. This computer program can be transmitted to the control unit in various ways via a transmission signal, for example by downloading from another computer, via wire and/or wirelessly, or by installation in a memory circuit. In particular, the transmission signal can be transmitted via the Internet.

Figure 3:
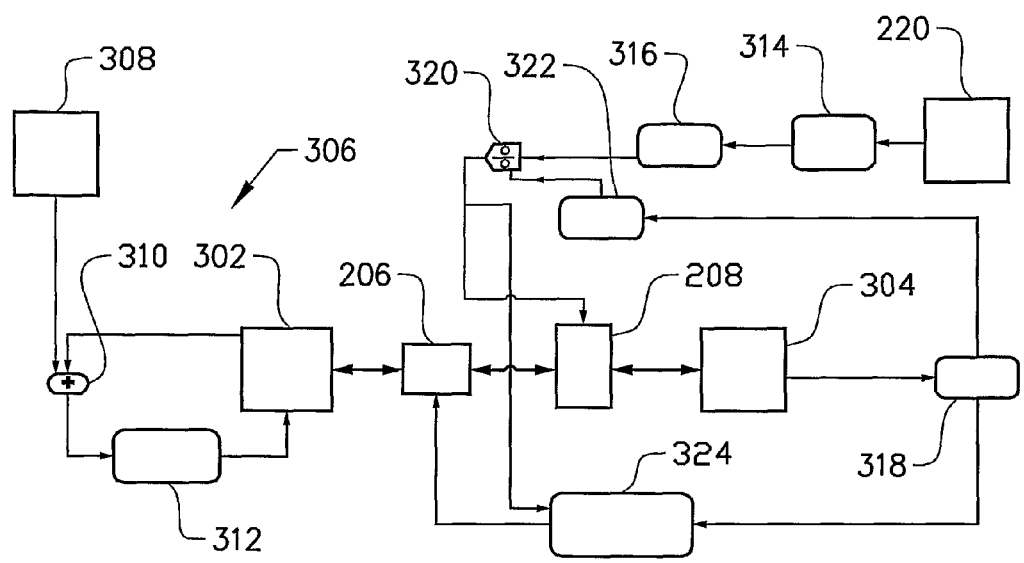

FIG. 3 schematically discloses a first embodiment of a method for controlling the vehicle 101. A mass 302, or inertia, is disclosed as an output from the power source 204. The mass 302 may be formed by a flywheel. The mass 302 is operatively connected to the gearbox 206 for transmission of torque therebetween. The gearbox 206 is operatively connected to the friction slip clutch 208 for transmission of torque therebetween. The friction slip clutch 208 is further operatively connected to a vehicle mass 304 for transmission of torque therebetween.

A conventional engine control is indicated with reference numeral 306. A desired engine speed value is input in box 308. An engine speed is detected in the engine and compared with the desired speed in box 310. The box 312 indicates controlling the engine on the basis of the result of the comparison between the actual engine speed and the desired speed.

An operator input from an accelerator pedal 220 is first filtered in box 314 and then a desired power is determined in box 316 on the basis of the degree of depression of the gas pedal 220. An actual vehicle speed is detected and is first filtered in box 318 and then furthered to box 320 via a box 322, in which the detected vehicle speed is compared with a minimum speed. In box 320, the demanded torque from box 316 is compared with the speed value from box 322 and a torque demand signal is generated to control the friction slip clutch 208.

Further, the filtered vehicle speed signal from box 318 and the torque demand signal from box 320 are sent to box 324, in which a gear shifting strategy is determined. Further, box 324 is connected to the gearbox 206 for gear shift control.

According to the first embodiment of the control method, the engine is controlled so that an engine speed is constant. The degree of actuation of the friction slip clutch 208 (and thereby the torque transmitted via the clutch) is controlled depending on the operator input via the gas pedal 220 and the detected vehicle speed. A working principle is that if the speed differential over the friction slip clutch 208 is below a first predetermined limit value, or above a second predetermined limit value, gears are shifted in the gearbox. Thus, the embodiment comprises gear shifting in the gearbox 206.

Figure 4:
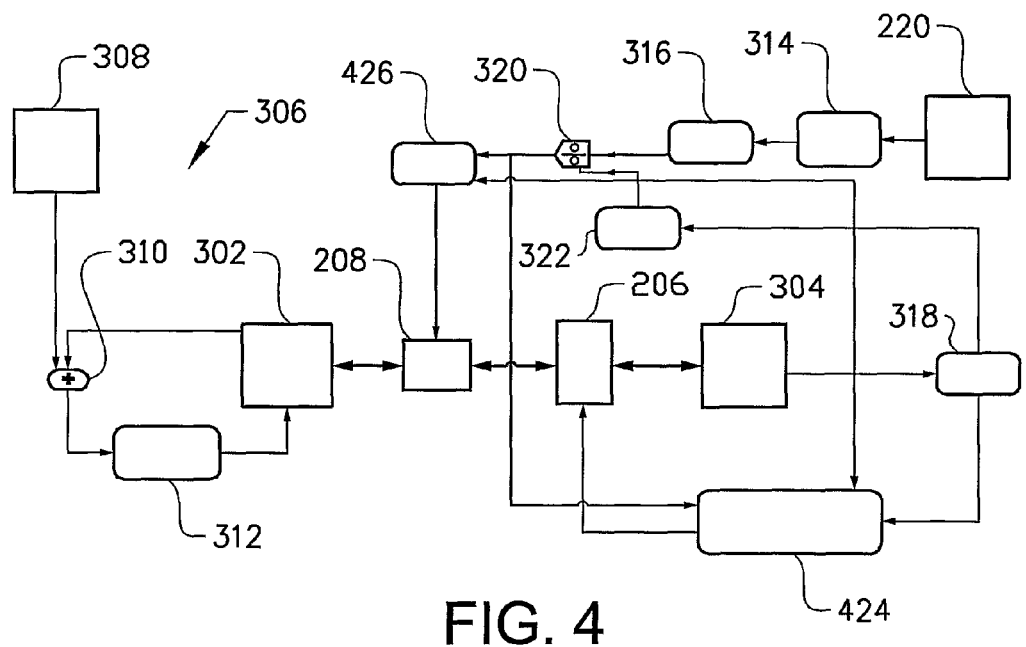

FIG. 4 schematically discloses a second embodiment of a method for controlling the vehicle 101. Only the differencies relative to the first embodiment will be described below. The friction slip clutch 208 is positioned between the engine 204 (see flywheel 302) and the gearbox 206. In addition to the steps described above for the first embodiment, a box 426 is adapted to receive the signal from the box 320 and a signal from the box 424 that controls gear shifting. The signals are evaluated and a torque demand signal is sent to the clutch 208 in response thereto.

Figure 5:
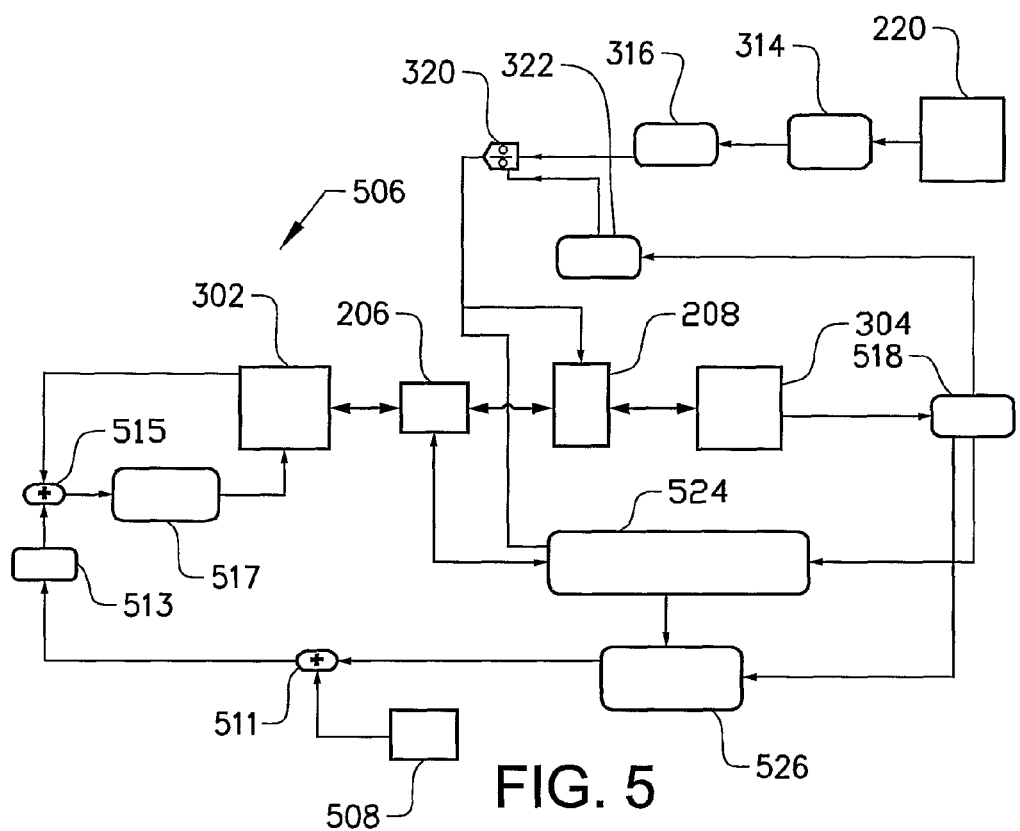

FIG. 5 schematically discloses a third embodiment of a method for controlling the vehicle 101. Only the differencies relative to the first embodiment will be described below. The method is adapted to maintain a differential speed over the friction slip clutch 208 at a substantially constant value. Further, the engine speed is varied accordingly. A box 526 is adapted to receive the signal from the box 524 that controls gear shifting and from a box 518, in which the vehicle speed signal is filtered. These signals are evaluated and a vehicle speed feedback signal is sent to the engine speed control 506 from the box 526.

A desired friction slip clutch differential speed value is input in box 508. The vehicle speed feedback signal from the box 526 and the desired friction slip clutch differential speed value signal from the box 308 are evaluated in box 511 and a desired speed signal is output. The desired speed value is compared in box 513 with a minimum and maximum speed value and a resulting speed value is sent to a box 515. An actual engine speed value is detected and input in box 515. The desired speed value is compared with the actual speed value in box 515 and a speed difference signal is sent to a box 517. A speed control is performed in box 517, wherein the engine speed is controlled according to any detected difference.

Figure 6:
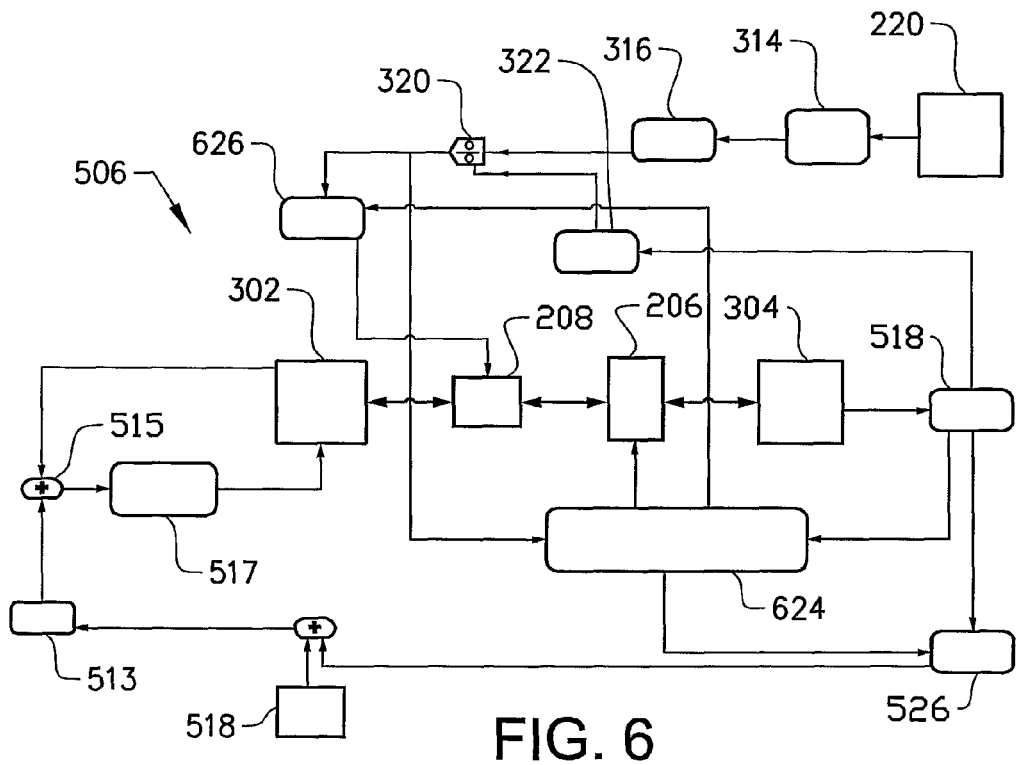

FIG. 6 schematically discloses a fourth embodiment of a method for controlling the vehicle 101. Only the differencies relative to the third embodiment will be described below. The friction slip clutch 208 is positioned between the engine 204 (see flywheel 302) and the gearbox 206. Further, like in the second embodiment shown in FIG. 4, a box 626 is adapted to receive the signal from the box 320 and a signal from the box 624 that controls gear shifting. The signals are evaluated and a torque demand signal is sent to the clutch 208 in response thereto.

Figure 7:
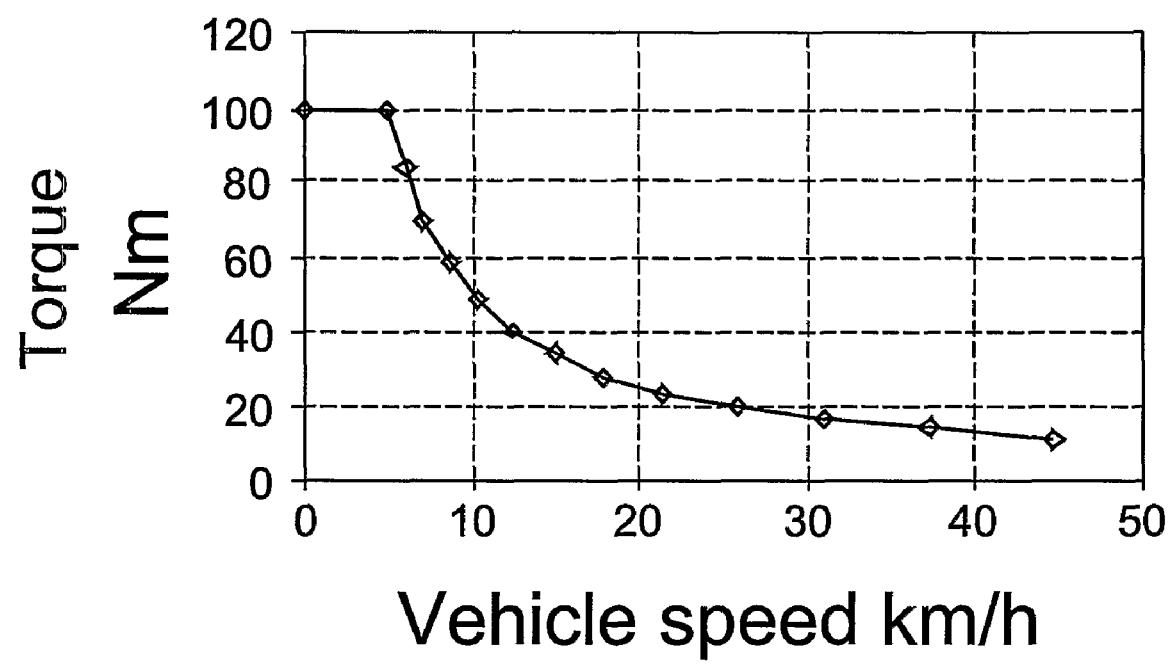

FIG. 7 discloses a graphical example of the friction slip clutch torque as a function of the actual vehicle speed for a specific depression of the gas pedal. Below a predetermined vehicle speed, for example 5 km/h, the clutch is controlled according to a constant maximum torque, for example 100 Nm.

The invention also relates to a computer program product comprising computer program segments stored on a computer-readable means for implementing the measurement method when the program is run. The computer program product can consist of or comprise, for example, a diskette or a CD.

While the present invention has been particularly shown and described with reference to the preferred embodiments above, it will be understood by those skilled in the art that various additional embodiments may be contemplated without departing from the scope of the following claims.

The invention is not limited to a vehicle with a power source in the form of a diesel engine. Instead, also other power sources, or prime movers, such as gasoline operated internal combustion engines, electric motors, alternative fuel prime movers and fuel cells are feasible.

According to an alternative, the invention is not limited to a vehicle with driving wheels 202. Instead, the invention may be used in a vehicle/machine with other types of ground engaging members, such as crawlers.

According to alternative embodiment, an additional control unit, which is separate from said control unit 216, is arranged for controlling an output power of the power source. The additional control unit is preferably in operational contact with the control unit 216.

According to an alternative, the friction slip clutch is adapted to engage a gear in a vehicle transmission operatively coupled in the powertrain. There are several clutches in the gearbox and a plurality of these clutches may be designed for operation as the inventive friction disc clutch.

According to a further alternative method, it comprises the steps of determining an acceleration of the vehicle and/or a load subjected to the vehicle, and determining whether a specific vehicle condition is present on the basis of the determined acceleration and/or load.

Further, the alternative method comprises the steps of controlling actuation of the friction slip clutch so that the friction slip clutch slips to a certain degree and transmits torque in response to a specific vehicle condition.

The invention claimed is:

1. A method for controlling a vehicle, comprising
receiving an operator input, the operator input comprising a first operator input received from depression of an accelerator and indicative of a desired power for performing a first function, and a second operator input received from manual operation of a control element indicative of a desired power for performing a second function, and
variably controlling at, least one pressure-actuated friction slip clutch in a vehicle powertrain in response to the received operator input in order to control a torque transmitted via the friction slip clutch so as to at least one of balance and prioritize an amount of power distributed for performing the first function and an amount of power distributed for performing the second function.

2. A method according to claim 1, comprising controlling, at least in one operation state, actuation of the friction slip clutch in such a manner that characteristics of a torque converter is simulated.

3. A method according to claim 1, comprising detecting a vehicle operational parameter, and controlling actuation of the friction slip clutch also in response to the detected vehicle operational parameter.

4. A method according to claim 1, comprising detecting a vehicle speed and controlling actuation of the friction slip clutch also in response to the detected vehicle speed.

5. A method according to claim 1, comprising controlling actuation of the friction slip clutch so that the friction slip clutch slips to a certain degree.

6. A method according to claim 1, comprising permitting variation in slippage in the at least one friction slip clutch in response to any disturbances in the powertrain.

7. A method according to claim 1, wherein the friction slip clutch is adapted to engage a gear in a gearbox operatively coupled in the powertrain.

8. A method according to claim 1, wherein the friction slip clutch is arranged separate from a gear shifting apparatus in a gearbox operatively coupled in the powertrain.

9. A method according to claim 1, comprising maintaining a speed of the power source at a substantially constant value at least for one vehicle state.

10. A method according to claim 1, comprising maintaining a differential speed over the friction slip clutch at a substantially constant value.

11. A method according to claim 10, comprising varying a speed of the power source in response to the maintained constant value of the differential speed of the friction slip clutch.

12. A method according to claim 1, comprising shifting gears in the gearbox in response to the received operator input.

13. A method according to claim 1, wherein the first operator input is indicative of a desired motive power for propelling the vehicle.

14. A method according to claim 13, comprising transmitting power from the power source to at least one ground engaging member of the vehicle in order to propel the vehicle in response to the first operator input.

15. A method according to claim 13, wherein a second operator input is indicative of a desired power to perform a work function, and the work function comprises moving a work implement, the method comprising evaluating the desired engine power for propelling the vehicle and the desired engine power for performing the desired work function, determining a proportion between the power transmitted in order to propel the vehicle and the power transmitted in order to perform the work function, and controlling the distribution of the power according to the determined proportion.

16. A method according to claim 1, wherein the second operator input is indicative of a desired power to perform a work function.

17. A method according to claim 16, wherein the work function comprises moving a work implement.

18. A method according to claim 16, wherein the work function is performed via a hydraulic system.

19. A method according to claim 18, comprising transmitting power from a power source in the powertrain to the hydraulic system in order to perform the desired work function.

20. A method according to claim 1, comprising receiving the operator input in a control unit, determining a degree of actuation of the friction slip clutch and actuating the friction slip clutch in response.

21. A computer programmed with software code for carrying out all the steps as claimed in claim 1.

22. A computer program product comprising software code stored on a non-transitory medium that can be read by a computer for carrying out all the steps as claimed in claim 1.

23. A system for controlling a vehicle, comprising
operator controlled elements, the operator controlled elements comprising an accelerator adapted to provide a first signal indicative of a desired power for performing a first function, and an operator controlled element adapted to provide a second signal indicative of a desired power for performing a second function,
a control unit adapted to receive the first and second signals, and in response to the first and second signals establish a signal indicative of a degree of actuation of a friction slip clutch in a powertrain, and
actuation means for actuating the friction slip clutch in response to the signal from the control unit in order to variably control a torque transmitted via the friction slip clutch so as to at least one of balance and prioritize an amount of power distributed for performing the first function and an amount of power distributed for performing the second function.

24. A system according to claim 23, comprising means for detecting a vehicle operational parameter, wherein the detection means is adapted to establish a signal indicative of the detected operational parameter to the control unit.

25. A system according to claim 24, comprising means for detecting a vehicle speed, wherein the detection means is adapted to establish a signal indicative of the detected vehicle speed to the control unit.

26. A system according to claim 23, wherein the friction slip clutch is adapted to engage a gear in a gearbox operatively coupled in the powertrain.

27. A system according to claim 23, wherein the friction slip clutch is arranged separate from a gear changing apparatus in a gearbox operatively coupled in the powertrain.

28. A system according to claim 23, wherein the accelerator adapted to establish a signal indicative of a desired motive power for propelling the vehicle.

29. A system according to claim 23, wherein the operator controlled element is adapted to establish a signal indicative of a desired power to perform a work function.

30. A heavy vehicle comprising the system according to claim 23.

31. A work vehicle comprising the system according to claim 23.

* * * * *